UNITED STATES PATENT OFFICE.

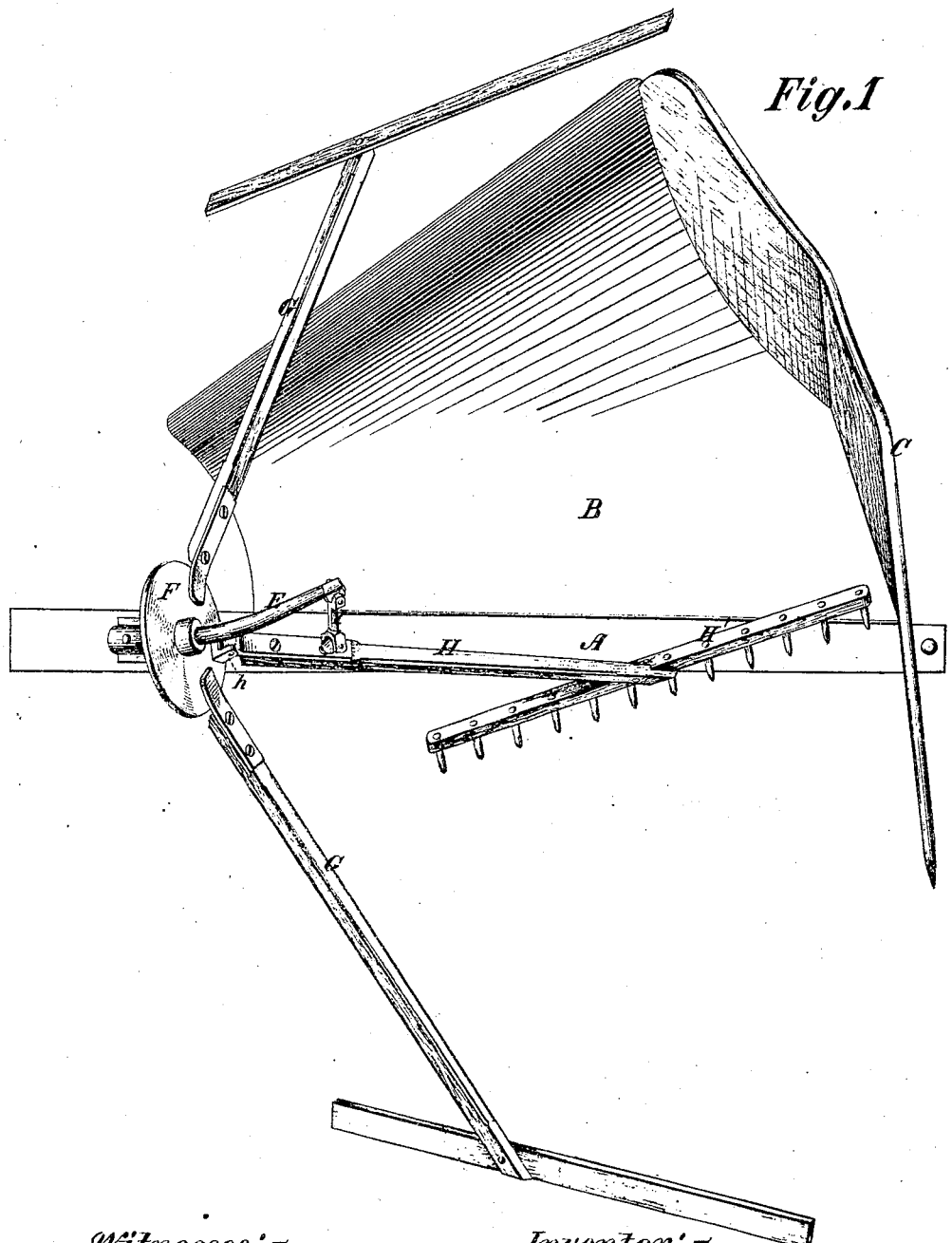

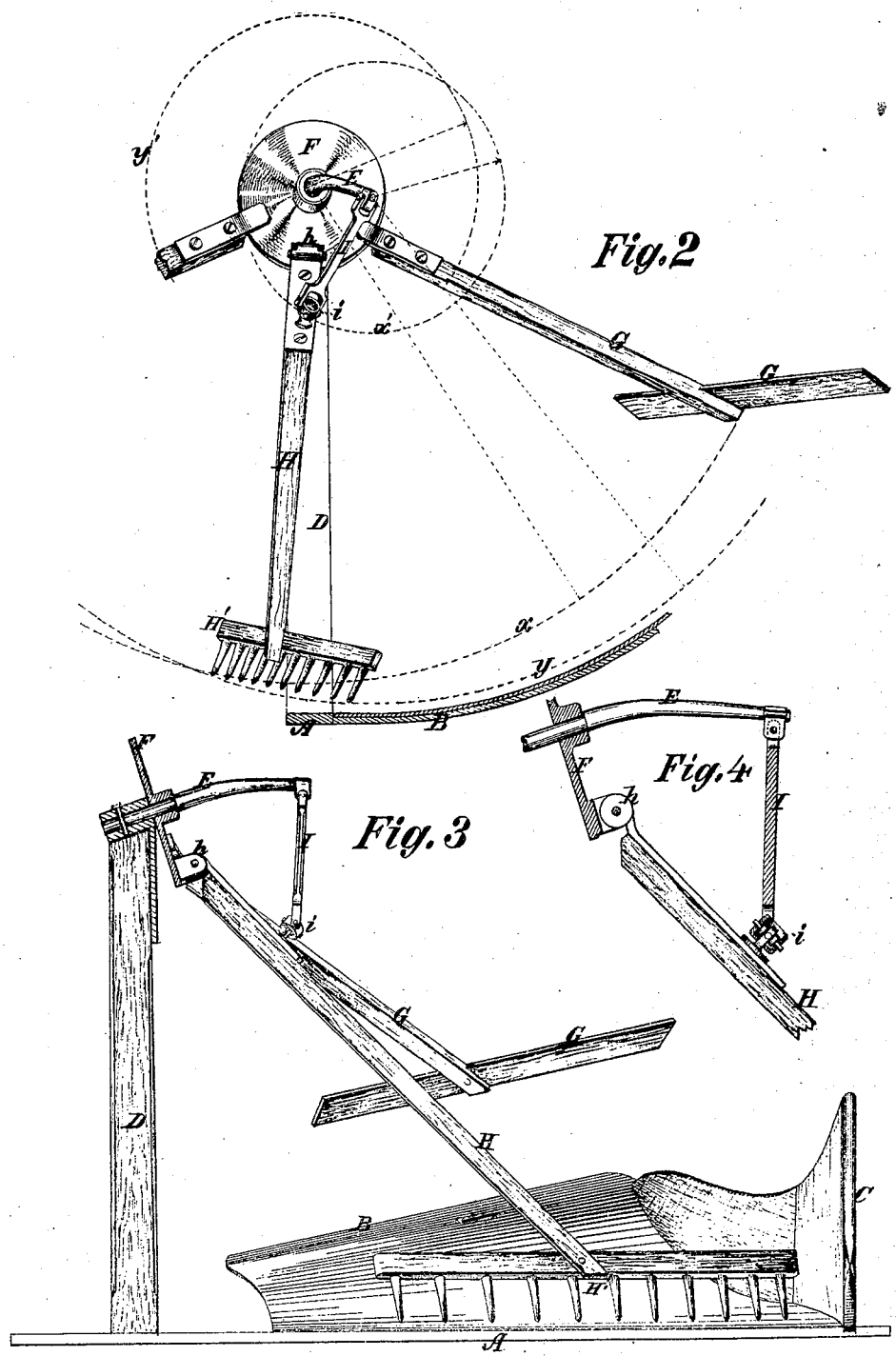

JOHN P. MANNY, OF ROCKFORD, ILLINOIS.

IMPROVEMENT IN HARVESTER-RAKES.

Specification forming part of Letters Patent No. 112,941, dated March 21, 1871.

*To all whom it may concern:*

Be it known that I, JOHN P. MANNY, of Rockford, in the county of Winnebago and State of Illinois, have invented certain new and useful Improvements in Harvesters and Harvester-Rakes, of which the following is a specification:

My invention relates to that class of harvesters having an automatic raking and reeling apparatus, consisting of reel-beaters rotating in a uniform path, and a rake revolving around the same axis as the reel, but in a path eccentric thereto. Its object is to simplify the construction while increasing the effectiveness of the machine; to which end the improvement consists in combining a series of continuously-rotating reel-beaters, a continuously-revolving rake hinged to and revolving with the reel-hub, a fixed stud, and a swiveling link connecting the rake-arm with the fixed stud at a point eccentric to the reel-axis, substantially in the manner hereinafter described, whereby I am enabled to produce the requisite movements of the rake without cams or gearing.

In the accompanying drawing, which shows such parts only of a harvesting-machine as are necessary to illustrate my invention, Figure 1 is a plan, showing the rake in the attitude of descending upon the platform to commence the discharge of the gavel; Fig. 2, an elevation, as seen from the divider side, with the platform in section; Fig. 3, a front elevation, with the reel-hub in section; and Fig. 4, an elevation, partly in section, showing the details of the rake mechanism.

Behind a finger-beam, A, I arrange a platform, B, by preference made concave, as shown in the drawing, and provided with a suitable fence, C.

A post, D, rising from the finger-beam, supports a fixed stud, E, inclined slightly backward and upward, and still further bent backward and downward at its outer end, for a purpose hereinafter explained.

Upon this stud revolves a hub, F, to which a series of reel-beaters, G, is secured.

Between two of these beaters a rake-arm, H, carrying a rake-head, H', is pivoted to lugs $h$ on the hub, so as to allow the rake to vibrate freely on its pivots.

A link, I, is pivoted or swiveled at one end to the stud E, so as to turn freely thereon, and at the other end is swiveled to the rake-arm by a gimbal-joint, $i$.

It is unnecessary here to describe the details of the mechanism for driving the rake and reel, as such devices form no part of the subject-matter herein claimed, and are well known to skillful harvester-builders.

In operation, the rake descends into the standing grain in advance of the finger-beam and parallel therewith in a horizontal plane, but inclined backward from the finger-beam toward the divider side thereof, and sweeps over the platform nearly parallel with its surface.

Owing to the backward and downward inclination of the stud, the rake, as it moves backward over the platform, is pushed away from the reel-axis, and is thus caused to sweep the platform in a straight line, gradually approaching the divider side of the platform and discharging the grain therefrom in a diagonal path gradually diverging from that of the reel.

In Fig. 2 the dotted line $x$ shows the path of the reel, while the other one, $y$, shows the path of the rake.

The line $x'$ shows the path traversed by the joint $i$ of the link, while that $y'$ shows that of the corresponding part of the reel-arms.

As the rake rises it is drawn within the path of the reel-beaters by the link, and descends into the standing grain to repeat the operation above described.

I claim as my invention—

The combination of the fixed stud, inclined backward relatively to the finger-beam, and having its outer end bent eccentrically to the reel-axis, the reel-hub rotating on said stud carrying reel-beaters rigidly attached thereto, and revolving in a uniform path, the rake-arm hinged to said hub, and the links swiveled both to the eccentric part of the stud and to the rake-arm, all these members being constructed and operating in combination, substantially as hereinbefore set forth.

In testimony whereof I have hereunto subscribed my name.

JOHN P. MANNY.

Witnesses:
RUFUS C. BAILEY,
L. A. WEYBURN.